United States Patent
Kuehr-McLaren et al.

(10) Patent No.: US 6,920,556 B2
(45) Date of Patent: Jul. 19, 2005

(54) METHODS, SYSTEMS AND COMPUTER PROGRAM PRODUCTS FOR MULTI-PACKET MESSAGE AUTHENTICATION FOR SECURED SSL-BASED COMMUNICATION SESSIONS

(75) Inventors: David Kuehr-McLaren, Apex, NC (US); Timothy G. Shoriak, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 09/909,709

(22) Filed: Jul. 20, 2001

(65) Prior Publication Data

US 2003/0018886 A1 Jan. 23, 2003

(51) Int. Cl.⁷ ................................................ H04L 9/00

(52) U.S. Cl. ...................... 713/151; 713/161; 713/170; 713/180; 713/181

(58) Field of Search .............................. 713/151, 170, 713/180, 181, 161

(56) References Cited

U.S. PATENT DOCUMENTS

| | | | |
|---|---|---|---|
| 4,933,969 A | 6/1990 | Marshall et al. | 380/125 |
| 5,048,087 A | 9/1991 | Trbovich et al. | 380/43 |
| 5,319,710 A | 6/1994 | Atalla et al. | 380/23 |
| 5,657,390 A | 8/1997 | Elgamal et al. | 380/49 |
| 5,671,283 A | 9/1997 | Michener et al. | 380/25 |
| 5,757,924 A | 5/1998 | Friedman et al. | 380/49 |
| 6,094,426 A | 7/2000 | Honkasalo et al. | 370/331 |
| 6,128,737 A | 10/2000 | Jakubowski et al. | 713/181 |
| 6,842,860 B1 * | 1/2005 | Branstad et al. | 713/170 |

OTHER PUBLICATIONS

Gennaro et al, "How to Sign Digital Streams", Feb. 24, 1998, pp. 1-20.*

Wagner et al, "Analysis of the SSl 3.0 Protocol", Nov. 1996, pp. 1-12.*

CSU webpage, "Introduction to Distributed Memory Programming", Mar. 7, 2001, pp. 1-14. <http://web.archive.org/web/20010307131257/http://athene.csu.edu.au/~ialtas/module2/section_9.html>.*

Wong et al, "Digital Signatures for Flows and Multicasts," Aug. 1999, pp. 502-513.*

Golle et al, "Authenticating Streamed Data in the Presence of Random Packet Loss," 2001, pp. 1-10.*

Miner et al, "Graph-Based Authentication of Digital Streams," May 2000, pp. 232-246.*

(Continued)

*Primary Examiner*—Andrew Caldwell
*Assistant Examiner*—Michael Pyzocha
(74) *Attorney, Agent, or Firm*—Myers Bigel Sibley & Sajovec; Gerald R. Woods

(57) ABSTRACT

Methods, systems and computer program products are provided of message authentication for an SSL-based protocol connection between a source device and a destination device. A group message authentication code (MAC) is generated based on a plurality of communication packets. Each of the communication packets has at least one data record. The plurality of communication packets is transmitted using the SSL-based protocol connection along with the generated group MAC. Individual ones of the plurality of communication packets do not include an associated packet MAC as transmitted. A data record count to a next group MAC may be transmitted before transmitting the data records corresponding to the data record count and transmitting the next group MAC. The data records of the communication packets may be pre-encrypted and transmitted using the SSL-based protocol connection to encrypt the group MAC but not the data records. Receiver side methods, systems and computer program products are also provided.

46 Claims, 12 Drawing Sheets

OTHER PUBLICATIONS

Park et al, "An Efficient Stream Authentication Scheme," Jan. 1999, pp. 1–8.*

Perrig et al., "The TESLA Broadcast Authentication Protocol," 2002, pp. 2–13.*

CMU, "Introduction", Nov. 5, 2000, pp. 1–2.*

Metzger et al, RFC 2841, "IP Authentication using Keyed SHA1 with Interleaved (IP–MAC)," Nov. 2000, pp. 1–9.*

Hoffman, RFC 2487, "SMTP Service Extension for Secure SMTP over TLS," Jan. 1999, pp. 1–8.*

Dierks et al, RFC 2246, "The TLS Protocol," Jan. 1999, pp. 1–80.*

* cited by examiner

| | | |
|---|---|---|
| 1 | C →S: | Client Hello With Delayed MAC Ciphersuite |
| 2 | S →C: | Server Hello Selecting Delayed MAC Ciphersuite |
| 3 | C →S: | (len to MAC=10) nnnnnnnnnnMAC |
| 4 | S →C: | (len to MAC=20) nnnnnnnnnn |
| 5 | S →C: | nnnnnnnnnnMAC (len to MAC=15) nnnnn |
| 6 | S →C: | nnnnnnnnnnMAC |
| 7 | C →S: | (len to MAC=10) nnnnnnnnnnMAC |
| 8 | S →C: | (len to MAC=30) nnnnnnnnnn |
| 9 | S →C: | nnnnnnnnnn |
| 10 | S →C: | nnnnnnnnnnMAC<br>Close Session |

Figure 10A

| | | |
|---|---|---|
| 1 | C →S: | Client Hello With Delayed MAC No Encrypt Ciphersuite |
| 2 | S →C: | Server Hello Selecting Delayed MAC No Encrypt Ciphersuite |
| 3 | C →S: | (len to MAC=10) eeeeeeeeeeMAC |
| 4 | S →C: | (len to MAC=20) eeeeeeeee |
| 5 | S →C: | eeeeeeeeeeMAC (len to MAC=15) eeeee |
| 6 | S →C: | eeeeeeeeeeMAC |
| | | Close Session |

Figure 10B

| | | |
|---|---|---|
| 1 | C →S: | Client Hello With Delayed MAC and pre-encrypt key |
| 2 | S →C: | Server Hello Selecting Delayed MAC and pre-encrypt key |
| 3 | C →S: | (key) (len to MAC=10) eeeeeeeeeeMAC |
| 4 | S →C: | (key) (len to MAC=20) eeeeeeeee |
| 5 | S →C: | eeeeeeeeeeMAC (key) (len to MAC=15) eeeee |
| 6 | S →C: | eeeeeeeeMAC<br>Close Session |

Figure 10C

METHODS, SYSTEMS AND COMPUTER PROGRAM PRODUCTS FOR MULTI-PACKET MESSAGE AUTHENTICATION FOR SECURED SSL-BASED COMMUNICATION SESSIONS

FIELD OF THE INVENTION

The present invention relates to secured communications and more particularly to secured communications based on the Secure Socket Layer (SSL) protocol.

BACKGROUND OF THE INVENTION

In communications between a client and a server, it is often beneficial to provide increased security. One mechanism for providing increased security is through the use of the Secure Socket Layer (SSL) protocol which uses a hybrid public-key system in which public-key cryptography is used to allow a client and a server to securely agree on a secret session key.

FIG. 1 illustrates a conventional SSL connection between a client 100 and a server 102. As seen in FIG. 1, the client 100 communicates directly with the server 12 utilizing the SSL connection 106. It is to be understood that the SSL protocol connection 106 will typically be established through a plurality of bridge/router devices.

The SSL protocol may provide privacy and integrity between two communicating applications. The SSL protocol typically utilizes two layers, the lowest layer of which is the SSL Record Protocol, which is layered on top of a communications protocol such as the transmission control protocol/Internet protocol (TCP/IP). The SSL Record Protocol encapsulates higher level protocols such as the SSL Handshake Protocol. The SSL Handshake Protocol generally allows the server and client to authenticate each other and to establish an encryption method and keys. The SSL protocol is further described in U.S. Pat. No. 5,657,390 entitled "Secure Socket Layer Application Program Apparatus and Method" which is incorporated herein by reference as if set forth in its entirety.

One advantage of SSL is that it is application protocol independent. A higher level protocol can layer on top of the SSL Protocol transparently. Thus, the SSL protocol provides connection security where encryption is used after an initial handshake to define a secret key for use during a session and where the communication partner's identity can be authenticated using, for example, a well known public certificate issuing authority. Examples of such well known certificate authorities include RSA Data Security, Inc, Verisign™ and EquiFax™.

SSL protocol encryption generally provides protection both against an unauthorized recipient accessing an encrypted message and against an unauthorized recipient secretly tampering with the contents of the message. Using SSL, a message(s) containing a plurality of packets is encrypted. In addition, an encrypted message authentication code (MAC) is generated for each packet which may be used to detect tampering with the data within a packet. The received MAC may be compared to a MAC calculated at the intended recipient based on the received packet. If the calculated and received MACs do not match, an error is detected which may indicate tampering with the packet.

One disadvantage of using SSL protocol communications in an Internet environment is that the SSL protocol itself is typically the bottleneck for secure Internet servers, like hypertext transfer protocol (HTTP) servers. The latency of the SSL protocol typically comes in three phases, including the extra network traffic, the use of RSA private key decryption for key exchange and the symmetric encryption of the bulk data to be transferred between the client and the server. The network overhead has been addressed previously by providing efficiencies in the SSL implementations as related to sockets. The RSA public/private key operations are addressed by various crypto-hardware products, such as the 4758 Cryptographic Adapter available from International Business Machines Corporation (IBM) of Armonk, N.Y. and the CryptoHighway RSA Accelerator, also available from IBM.

Symmetric encryption of the bulk data is generally not considered as severe of a central processing unit (CPU) consumer as the RSA operations. Nonetheless, symmetric encryption typically consumes an increased amount of CPU resources as compared to clear text transmittal. Various crypto hardware accelerators contain circuitry for symmetric ciphers (data encryption standard (DES), 3DES, RC4), but the nature of the SSL protocol makes it difficult to obtain any advantage through the use of such crypto co-processors. The maximum size of the data payload generally specified for an SSL data packet is 16K bytes. In addition, higher level applications utilizing the SSL layer for secured transmissions may impose a lesser payload size. For example, the Domino Go Webserver (DGW) webserver generally prefers the use of record sizes of 4K bytes. Crypto co-processors generally work most efficiently with large chunks of data. The SSL protocol, however, prohibits encrypting more than a maximum record size of the data, generally 16 k bytes, as each encrypted record contains a hash of clear text data included in the payload. Furthermore, both the encryption key and the hash key are typically determined per SSL connection and used across multiple packets.

SSL-based protocols, such as SSL and Transport Layer Security (TLS), typically provide a message authentication code for each data record (or packet) to make it easier to stream data through network connections. However, these protocols were generally not designed with the efficient use of crypto-hardware as a consideration nor for the graphic intensive web pages that are popular with various e-business and other Internet ventures. Furthermore, the challenges of providing large sets of mundane or repetitive data through encryption has generally not been addressed by methods other than the use of crypto-hardware, such as described above, in an attempt to accelerate the existing protocols. Attempts outside of protocols, such as cryptolopes and secure datagrams have been attempted but, because such approaches did not fit well with existing defined web infrastructures, they are limited in their potential to fully address the problem without disruption. Thus, approaches which facilitate encrypted communication of large quantities of data records in the web environment in a manner which is consistent with the existing framework of such an environment would be desirable.

SUMMARY OF THE INVENTION

Embodiments of the present invention provide methods of message authentication for an SSL-based protocol connection between a source device and a destination device. In source device embodiments of the present invention, a group message authentication code (MAC) is generated based on a plurality of communication packets, each of the communication packets having at least one data record. The plurality of communication packets are trasmitted using the SSL-based protocol connection along with the generated group MAC. Ones of the plurality of communication packets do not include an associated packet MAC.

In further embodiments of the present invention, a record count is also transmitted using the SSL-based protocol connection. The record count indicates a number of data records to be received before a next group MAC. The data records associated with the record count correspond to a next plurality of communication packets to be transmitted and the next group MAC is generated based on the next plurality of communication packets to be transmitted The record count may be transmitted using the SSL-based protocol connection before the next plurality of communication packets and the next group MAC may be transmitted after the next plurality of communication packets. The record count may be transmitted using the SSL-based protocol connection either with the first plurality of communication packets or at a beginning of the next plurality of communication packets. The record count may be transmitted following the generated group MAC without any intervening data records.

In other embodiments of the present invention, a last plurality of communication packets is transmitted using the SSL-based protocol connection along with a last group MAC. The last group MAC is generated based on the last plurality of communication packets. The SSL-based protocol connection is closed following transmission of the last plurality of communication packets.

In yet further embodiments of the present invention, a group of communication packets from at least one of the plurality of communication packets have pre-encrypted data records. Data records of the group of communication packets are encrypted to provide the pre-encrypted data records. The pre-encrypted data records are stored. Ones of the stored pre-encrypted data records are retrieved for transmission responsive to a request for transmission of the ones of the stored pre-encrypted data records. The retrieved ones of the stored pre-encrypted data records are transmitted using the SSL-based protocol connection without using the SSL-based protocol connection to encrypt the retrieved ones of the stored pre-encrypted data records. A group MAC generated based on the retrieved ones of the stored pre-encrypted data records is transmitted using the SSL-based protocol connection to encrypt the group MAC generated based on the retrieved ones of the stored pre-encrypted data records.

In other pre-encryption based embodiments of the present invention, the SSL-based protocol connection is established with a designated client and the pre-encrypted data records are associated with the designated client. Data records of the group of communication packets are encrypted using a public key of the designated client. A client certificate of the designated client may be negotiated in establishing the SSL-based protocol connection. The public key of the designated client may then be determined based on the client certificate. In alternative embodiments, the data records of the group of communication packets are encrypted using a temporary key known by the designated client.

In further pre-encryption based embodiments of the present invention, a pre-encryption key is transmitted to the designated client using the SSL-based protocol connection. The data records of the group of communication packets are encrypted using the pre-encryption key. The pre-encryption key may be trasmitted to the designated client with the record count. A plurality of groups of communication packets having pre-encrypted data records may be transmitted using the SSL-based protocol connection, each of the groups of communication packets having an associated group MAC and an associated record count. The associated group MACs and associated record counts may be transmitted using the SSL-based protocol connection to encrypt the associated group MACs and associated record counts and the pre-encrypted data records may be transmitted without using the SSL-based protocol connection to encrypt the pre-encrypted data records. The pre-encryption key may then be transmitted to the designated client with each of the associated record counts.

In other, receiver side embodiments of the present invention, methods, systems and computer program products are provided for message authentication for an SSL-based protocol connection between a source device and a destination device. A first plurality of communication packets and a group MAC that was generated based on the first plurality of communication packets are received. Ones of the first plurality of communication packets do not include an associated packet MAC. A calculated MAC is generated based on the received first plurality of communication packets. It is determined if an error has occurred in the received first plurality of communication packets based on a comparison of the calculated MAC and the received group MAC. The SSL-based protocol connection may be terminated if it is determined that an error has occurred.

In further embodiments of the present invention, a record count is received at the destination device. The record count indicates a number of data records to be received before a next group MAC. The next group MAC is generated based on a next plurality of communication packets corresponding the data records associated with the record count. A number of data records of the next plurality of communication packets corresponding to the received record count are received. The next group MAC is also received. A next calculated MAC is generated based on the received data records of the next plurality of communication packets. It is determined if an error has occurred in the received data records of the next plurality of communication packets based on a comparison of the next calculated MAC and the received next group MAC. The record count may be received using the SSL-based protocol connection before the data records of the next plurality of communication packets corresponding to the received record count. The record count may be received after the first group MAC without any intervening data records.

In yet other embodiments of the present invention, systems are provided for message authentication for an SSL-based protocol connection between a source device and a destination device. A group message authentication code (MAC) generation circuit generates a group MAC based on a plurality of communication packets, each of the communication packets having at least one data record. A transmitter transmits the plurality of communication packets using the SSL-based protocol connection along with the generated group MAC, wherein ones of the plurality of communication packets do not include an associated packet MAC. The system may also include a record count generation circuit that generates a record count indicating a number of data records to be received before a next group MAC, the data records associated with the record count corresponding to a next plurality of communication packets to be transmitted. In such embodiments, the transmitter is further configured to transmit the record count using the SSL-based protocol connection and the group MAC generation circuit is further configured to generate the next group MAC based on the next plurality of communication packets to be transmitted.

The system in various embodiments further includes an SSL-based connection control circuit that closes the SSL-based protocol connection following transmission of a last plurality of communication packets. A pre-encryption circuit may be provided that encrypts data records of a group of communication packets based on either a temporary key or a client key associated with a designated client associated with the SSL-based protocol connection to provide pre-encrypted data records. In such embodiments, the transmitter is further configured to transmit the pre-encrypted data records without using the SSL-based protocol connection to encrypt the pre-encrypted records and to transmit a group MAC generated based on the pre-encrypted data records using the SSL-based protocol connection to encrypt the group MAC generated based on the pre-encrypted data records. The SSL-based connection control circuit may be configured to establish the SSL-based protocol connection with the destination device as a pre-encrypted data records based connection.

In further embodiments of the present invention, systems are provided for message authentication for an SSL-based protocol connection between a source device and a destination device. A receiver receives a first plurality of communication packets and a group MAC that was generated based on the first plurality of communication packets, wherein ones of the first plurality of communication packets do not include an associated packet MAC. A message authentication code (MAC) generation circuit generates a calculated MAC based on the received first plurality of communication packets. An error detection circuit determines if an error has occurred in the received first plurality of communication packets based on a comparison of the calculated MAC and the received group MAC.

As will further be appreciated by those of skill in the art, while described above primarily with reference to method aspects, the present invention may be embodied as methods, apparatus/systems and/or computer program products.

BRIEF DESCRIPTION OF THE DRAWINGS

FIGS. 10A–10C illustrate exemplary communications between a client device and a server device according to embodiments of the present invention.

DETAILED DESCRIPTION OF THE INVENTION

Figure 1:
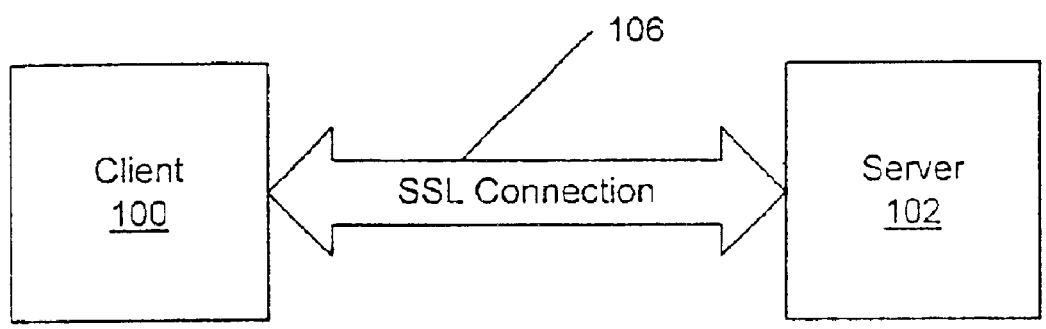
FIG. 1 is block diagram illustrating conventional SSL communications between a client and a server.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java® Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Figure 2:
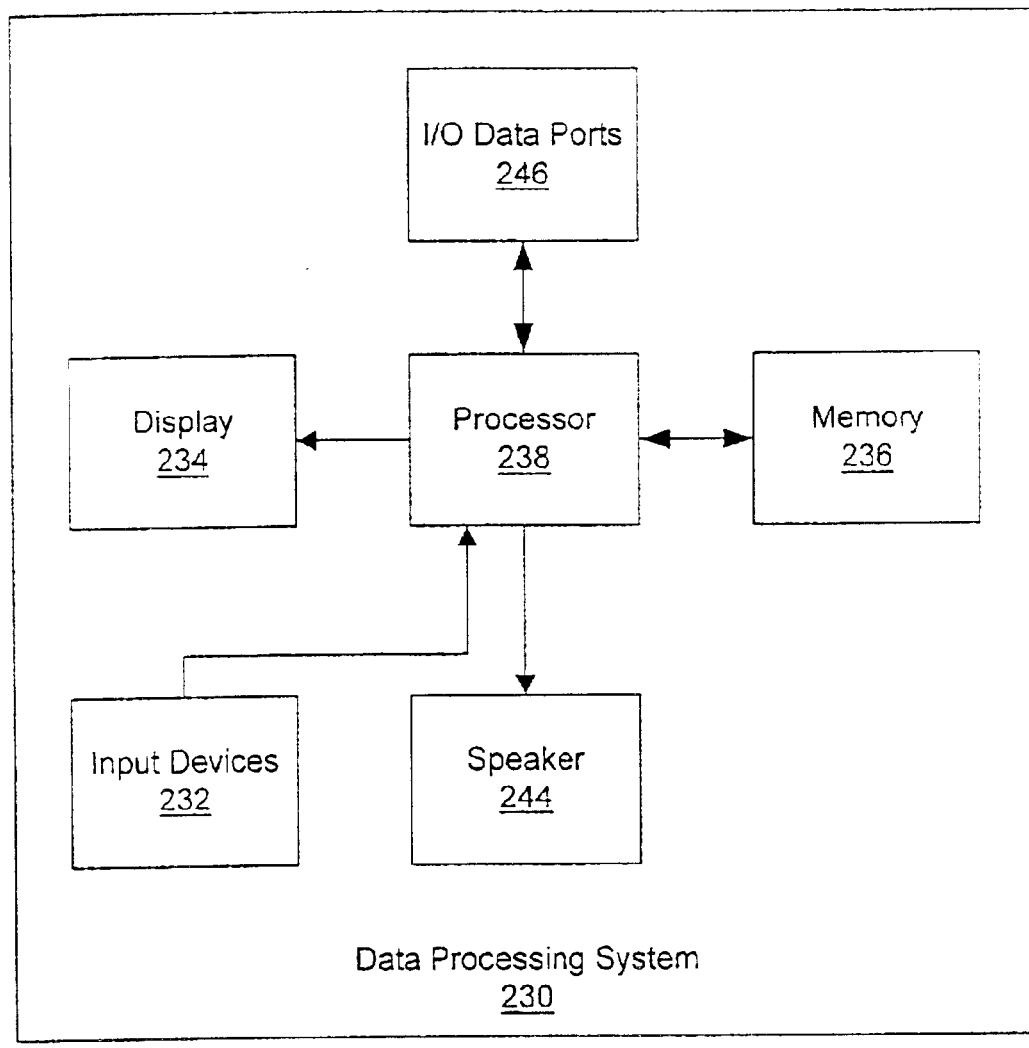
FIG. 2 is a block diagram of a data processing system according to embodiments of the present invention.

Various embodiments of the present invention will now be described with reference to the figures. FIG. 2 illustrates an exemplary embodiment of a data processing system 230 in accordance with embodiments of the present invention. The data processing system 230 typically includes input device (s) 232 such as a keyboard or keypad, a display 234, and a memory 236 that communicate with a processor 238. The data processing system 230 may further include a speaker 244, and an I/O data port(s) 246 that also communicate with the processor 238. The I/O data ports 246 can be used to transfer information between the data processing system 230 and another computer system or a network, for example, using an SSL protocol connection over the Internet. These components may be conventional components such as those used in many conventional data processing systems which may be configured to operate as described herein.

Figure 3:
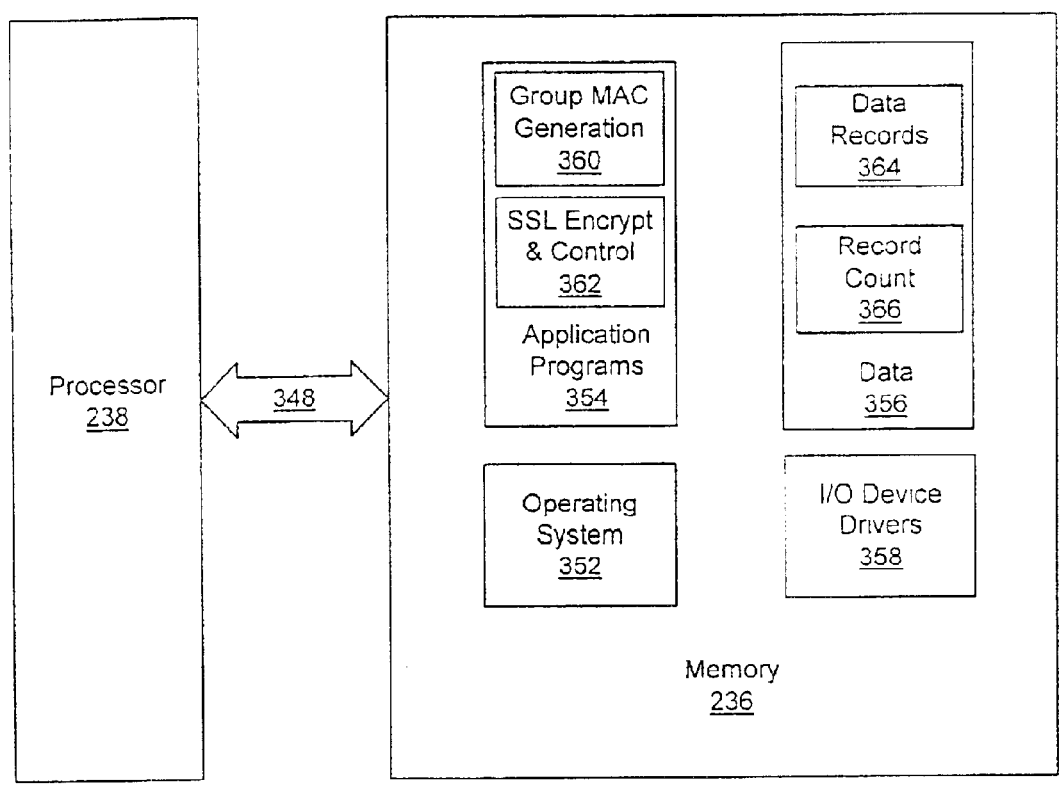
FIG. 3 is a more detailed block diagram of data processing systems according to embodiments of the present invention.

FIG. 3 is a block diagram of embodiments of data processing systems that illustrates systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is riot limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as OS/2, AIX or System390 from International Business Machines Corporation, Armonk, NY, Windows95, Windows98 or Windows2000 from Microsoft Corporation, Redmond, Wash., Unix or Linux configured to support an SSL-based protocol connection. The I/O device drivers 358 typically include software routines accessed through the operating system 352 by the application programs 354 to communicate with devices such as the input devices 232, the display 234, the speaker 244, the I/O data port(s) 246, and certain memory 236 components. The application programs 354 are illustrative of the programs that implement the various features of the data processing system 230 and preferably include at least one application which supports operations according to embodiments of the present invention. Finally, the data 356 represents the static and dynamic data used by the application programs 354, the operating system 352, the I/0 device drivers 358, and other software programs that may reside in the memory 236.

As used herein, references to SSL-based protocol refers to protocols, including TLS, where a message authentication code (MAC) is included for each packet and not only to those currently defined protocols referred to as SSL. Thus, while the present invention is described with reference to the SSL protocol herein, it will be understood that the present invention may be utilized with any SSL-based protocol.

As is further seen in FIG. 3, the application programs 354 may include a group MAC generation module 360 and an SSL encrypt and control module 362. The group MAC generation module 360 carries out operations as described herein related to generating a group MAC based on a plurality of communication packets, each of which include at least one data record. The SSL encrypt and control module 362 operates in coordination with the operating system 352 and the I/0 device drivers 358 to support SSL protocol connections through the I/O data ports 246.

The data portion 356 of memory 236, as shown in the embodiments of FIG. 3, includes data records 364 and a record count 366. The data records 364, in various embodiments of the present invention, represent the data records included in communication packets of a plurality of communication packets to be transmitted with an associated group MAC. In various embodiments of the present invention, data records may be pre-encrypted and stored in a pre-encrypted form for transmission on one or more occasions responsive to requests to transmit a group of pre-encrypted data records. The record count 366 contains a number of data records associated with a next group MAC and may be updated during an SSL protocol connection session as subsequent pluralities of communication packets and associated group MACs are transmitted.

While the present invention is illustrated, for example, with reference to the SSL Encrypt and Control module 362 being an application program in FIG. 3, as will be appreciated by those of skill in the art, other configurations may also be utilized while still benefitting from the teachings of the present invention. For example, the SSL Encrypt and Control module 362 and/or the group MAC generation module 360 may also be incorporated into the operating system 352 or other such logical division of the data processing system 230. Thus, the present invention should not be construed as limited to the configuration of FIG. 3 but is intended to encompass any configuration capable of carrying out the operations described herein.

A source device 400 and a destination device 450 invention supporting SSL communication sessions according to embodiments of the present invention will now be described with reference to the block diagram of FIG. 4. A client and/or a server device may operate as both a source device 400 and a destination device 450. A client source/destination device may include a browser application executing on the client device. The browser application, as known to those of skill in the art, supports HTTP communications and further supports HTTPS secured communications. The connection is typically supported using the Internet protocol over a network. As known to those of skill in the art, commercially available browser applications typically include a public key ring which is provided with the browser application. The public key ring generally includes the associated public keys for various well known certificate authorities such as RSA™ and Verisign™. The browser application and a public certificate authorized server support establishment of a secured SSL connection session between the client and a server. This SSL connection may be negotiated based on a certificate transmitted between the server and the client. Thus, various aspects of the SSL connection control circuits 410, 460 may be implemented in a browser application executing on a client device and/or a corresponding server application executing on a server device so as to implement multi-packet MACs in accordance with embodiments of the present invention without disturbing the fundamentals of SSL/TLS protocol communications.

Figure 4:
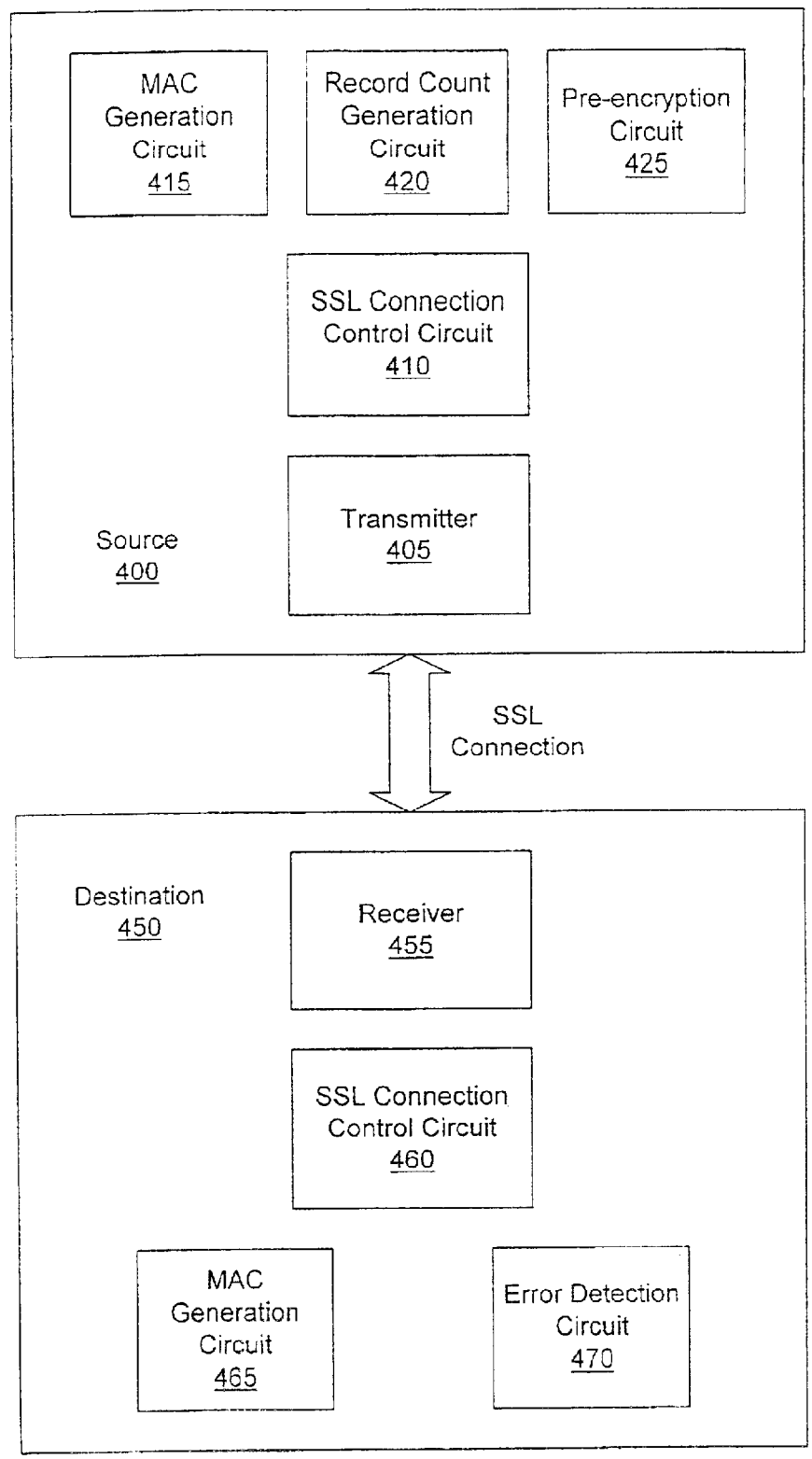
FIG. 4 is a block diagram illustrating embodiments of source devices and destination devices providing multi-packet message authentication for an SSL-based protocol connection between the devices.

As shown in FIG. 4, the source device 400 includes a group message authentication code (MAC) generation circuit 415 that generates a group MAC based on a plurality of communication packets, each of the communication packets having at least one data record. The source device 400 further includes a transmitter 405 that transmits the plurality of communication packets using the established SSL protocol connection with the destination device 450. The transmitter 405 further transmits the generated group MAC from the MAC generation circuit 415. More particularly, the transmitter 405 transmits the plurality of communication packets without any included associated packet MACs, instead providing the group MAC from the group MAC generation circuit 415.

The source device 400, in various embodiments of the present invention, further includes a record count generation circuit 420. The record count generation circuit 420 generates a record count indicating a number of data records to be received before a next group MAC will be received. The data records associated with the record count from the record count generation circuit 420 correspond to a next plurality of communication packets to be transmitted. Furthermore, the group MAC generation circuit 415 is configured to generate the next group MAC based on this same group of data records defining the next plurality of communication packets to be transmitted. The transmitter 405 is further configured to transmit the record count to the destination device 450 using the SSL protocol connection so that the destination device 450 will be aware of how many data records it should receive before a next group MAC is expected. Thus, the destination device 450 may use the transmitted record count in controlling its calculation of a MAC based on a block of received records corresponding to the record count before receiving a received group MAC from the source device 400 for comparison to its calculated MAC as will be described later herein.

The source device 400 shown in FIG. 4 also includes an SSL connection control circuit 410 that is operative to control various aspects of the SSL connection. In various embodiments, the SSL connection control circuit 410 is configured to close (terminate) the SSL protocol connection following transmission of a last plurality of communication packets associated with the SSL connection session between the source device 400 and the destination device 450. The SSL connection control circuit 410 may further be operative to implement various other known aspects of SSL protocol connection communications unrelated to the particular aspects of the present invention which aspects will not be further described herein.

A client or server may be both a source device 400 and a destination device 450 and the SSL connection control circuit 410 and the SSL connection control circuit 460 may be implemented as a common circuit or module on the client or server device. Various of the other aspects of the present invention as described herein which are shown as separate modules or circuits may also be implemented with operations from the various blocks combined or separated in a different manner while still providing support for operations according to the present invention as described herein.

Also shown in the source device 400 in FIG. 4 is a pre-encryption circuit 425 which may be provided to support various optional pre-encryption aspects of the present invention. The pre-encryption circuit 425 is configured to encrypt data records of a group of communication packets based on a key other than the SSL connection key which is used by the SSL connection control circuit 410 to implement conventional SSL protocol secured communications between the source device 400 and the destination device 450. In various embodiments of the present invention, the pre-encryption circuit 425 encrypts the data records prior to transmission using a temporary key or a client key associated with the destination device 450 to provide pre-encrypted data records for later transmission over the SSL connection. In embodiments supporting pre-encryption and including the pre-encryption circuit 425, the transmitter 405 is further configured to transmit the pre-encrypted data records without using the SSL protocol connection to encrypt the pre-encryption records. In such embodiments, the transmitter 405 is, however, still configured to transmit a group MAC generated based on the pre-encrypted data records using the SSL protocol connection to encrypt the associated group MAC for the pre-encrypted data records.

In various embodiments of the present invention, when the source device 400 wishes to utilize pre-encryption, the SSL connection control circuit 410 is further configured to establish the SSL protocol connection with the destination device 450 as a pre-encrypted data records based connection. Operations related to establishing multi-packet message authentication and specifying the type of multipacket authentication (pre-encrypted, non pre-encrypted, etc.) will be further described with reference to the exemplary communication exchange as shown in FIGS. 10A–10C.

As will be clear from the description of FIGS. 10A–10C, various embodiments of the present invention may be alternatively selectable between a source device 400 and a destination device 450 when using multi-packet message authentication in accordance with the present invention. It is also to be understood that conventional SSL protocol connection communications may continue to be provided between the source device 400 and the destination device 450 when desired by not specifying the use of multi-packet message authentication in accordance with the present invention.

The destination device 450 as illustrated in FIG. 4 will now be further described. As shown in FIG. 4, the destination device 450 includes a receiver 455 that receives the transmitted pluralities of communication packets from the source device 400. The receiver 455 further receives the group MAC that was generated based on respective pluralities of communication packets in which the individual ones of the communication packets do not include an associated packet MAC. The destination device 450 further includes a MAC generation circuit that generates a calculated MAC based on the received pluralities of communication packets. An error detection circuit 470 determines if an error has occurred in a received plurality of communication packets based on a comparison of the calculated MAC from the MAC generation circuit 465 and the received group MAC from the receiver 455.

In various embodiments, the receiver 455 is further configured to receive a record count from the source device 400 as described above. The record count may then be used by the destination device 450 to identify a next group of data records to be received and used by the MAC generation circuit 465 to generate a next calculated MAC which will be compared by the error detection circuit 470 to a next received group MAC to determine if an error has occurred in the received data records corresponding to the specified record count. Operations as described may be repeated for subsequent groups of data records and group MACs and record counts as described until a last group of communication packets has been received for an SSL protocol connection session.

While the present invention was generally described with reference to FIGS. 2–4 with respect to a computer system, as will be appreciated by those of skill in the art, the present invention may be incorporated into many other devices where SSL-based communication sessions are desired and, thus, may comprise an embedded function in many other devices. Thus, the present invention should not be construed as limited to use in computer systems such as illustrated in FIGS. 2–4 but may be incorporated in any device having sufficient processing capabilities to carry out the operations described below.

Exemplary communications for various embodiments of the present invention will now be described with reference to FIGS. 10A through 10C. Referring first to FIG. 10A, embodiments of the present invention not utilizing pre-encryption will now be further described with reference to the exemplary communication exchanges shown in FIG. 10A. The operations illustrated in FIG. 10A are based on embodiments of the present invention in which a new ciphersuite application is added to TLS to indicate to a partner device that the MAC for the SSL connection session will not be provided for each packet, but rather, will only be provided following the last data record used to transmit a specified number of bytes associated with a plurality of communication packets. Note that, as used herein, a packet may correspond to single data record or may be defined as including a plurality of data records. More particularly, a "packet" corresponds to the record size provided by the SSL-based protocol, or higher layer applications utilizing the SSL-based protocol which impose a different standard, as the maximum number of data records to be transmitted before a corresponding MAC is transmitted under the protocol.

The new delayed MAC ciphersuite application, as illustrated in FIG. 10A, first exchanges a "Hello" between a client device setting up the session and the server device, the "Hello" indicating the use of the delayed MAC ciphersuite. The server then sends a corresponding "Hello" acknowledging selection of the delayed MAC ciphersuite. The delayed MAC ciphersuite application then indicates that the first SSL data record will contain a length (number of bytes) that will be transmitted before the MAC will be sent (len to MAC= 10). Thus, as shown in the third line of FIG. 10A, the client initially sends a data record indicating the length (record count) to the next MAC equal ten.

The receiving partner then decrypts the data across the multiple data records (packets) and calculates the group MAC across the total number of bytes specified. When the total number of bytes has been reached, the receiver of the data (the server device in line 3 of FIG. 10A) will expect to receive, and then decrypt, the transmitted group MAC based on the SSL connection encryption. The calculated MAC is then compared with the received and decrypted MAC. If the MACs match, the session may continue. If the MACs do not match, an error (or attack) may be considered to have occurred and the session may be terminated (closed).

As shown for the embodiments illustrated in FIG. 10A, the data record immediately after the MAC is the number of bytes (record count) to be expected before the next MAC. Note that this record count length value could be contained in the current data record or at the beginning of a next data record although it preferably is provided immediately following a MAC. For example, with reference to the operations shown in FIG. 10A at lines 4–6 for data communication from the server device to the client device, a data count (len to MAC=20) is sent, followed by the 20 data records ("n"), followed by a first group MAC, followed by a next data count (len to MAC=15), followed by the corresponding 15 data records and a next group MAC. Thus, the group MAC at line 5 is immediately followed by the second data record count of 15.

In various embodiments of the present invention, the destination device may utilize a resettable MAC calculation circuit and a running MAC calculation in which the destination device resets the running MAC calculation and starts again following processing of a previously received MAC. The SSL connection session may be ended when the last data record transmitted ends with a MAC and the partner device may then close the connection. A connection that is closed before all data sent has been accounted for in a MAC calculation may be designated as an error. Note that, for the embodiments illustrated in FIG. 10A, the payload of the data record is encrypted with the proper SSL connection session key and "n" indicates a byte of application data so encrypted.

Embodiments of the present invention utilizing pre-encryption will now be further described with reference to FIG. 10B. For the operations shown in FIG. 10B, data to be transmitted is pre-encrypted (i.e., encrypted before being requested and passed to the SSL connection application). The pre-encrypted data may be stored, for example, in a cache associated with a particular destination device. For example, where the data is pre-encrypted at a server device, the cache containing the pre-encrypted data may be associated with a particular client or a group of clients that share the encryption key used to pre-encrypt the data. As an example, the pre-encrypt key could be a client's public key which may be derived, for example, from the client's certificate negotiated in establishing an SSL connection session.

Such pre-encryption may be beneficial, for example, with a file, such as a GIF file, that may appear several times on a series of SSL protected web pages (e.g., a bullet graphic). The first time the GIF file is served, it may be encrypted once with a temporary key (or a client's public key) and served many times in a short duration without requiring encryption based on the SSL connection session encryption key each time it is served. Note that the pre-encrypted item could still be made private to the session. Alternatively, where the disclosure of the pre-encrypted item is not as sensitive, the data could be clear text.

The SSL connection session may still be used to encrypt the MAC in accordance with the discussion of FIG. 10A above. However, the pre-encrypted data itself would not be encrypted with the SSL bulk data symmetric keys used in the SSL connection session. For the exemplary operation shown in FIG. 10B, only the length of bytes before a next MAC and the MAC records are encrypted with the proper SSL session key. The "e"references in FIGS. 10B and 10C represent a byte of pre-encrypted application data. Otherwise, the operations illustrated in FIG. 10B proceed as described previously with reference to FIG. 10A.

In various further embodiments using pre-encryption in accordance with the present invention, standard formats for encrypting messages, such as public-key cryptography standards No. 7 (PKCS#7) and pretty good privacy (PGP) could be delivered in a corresponding manner through the SSL connection session. Such embodiments may utilize a pre-ordained key, or a negotiation for the pre-encryption key outside of the SSL connection session. However, such an approach can be extended to deliver the key used to pre-encrypt the data by adding the preencrypt key, for example, to the header used to store the number of bytes (record count) before a next MAC. Such embodiments are illustrated in FIG. 10C. It is to be understood that, for the embodiments illustrated in FIG. 10C, as with FIG. 10B, only the length of bytes before the next MAC and the MACs themselves are encrypted with the proper SSL connection session key. FIG. 10C differs from FIG. 10B in the inclusion of the "(key)" transmissions which are shown as transmitted with each of the respective data record count transmissions.

For the various operations shown in FIGS. 10A–10C, both the client and server device communicate using the modified ciphersuite applications of the present invention. However, it is to be understood that ciphersuite applications could be provided where one device is utilizing traditional SSL data records that include the MAC in each record (packet) while the partner device utilizes delayed MAC and/or pre-encryption as described with references to FIGS. 10A–10C.

Figure 5:
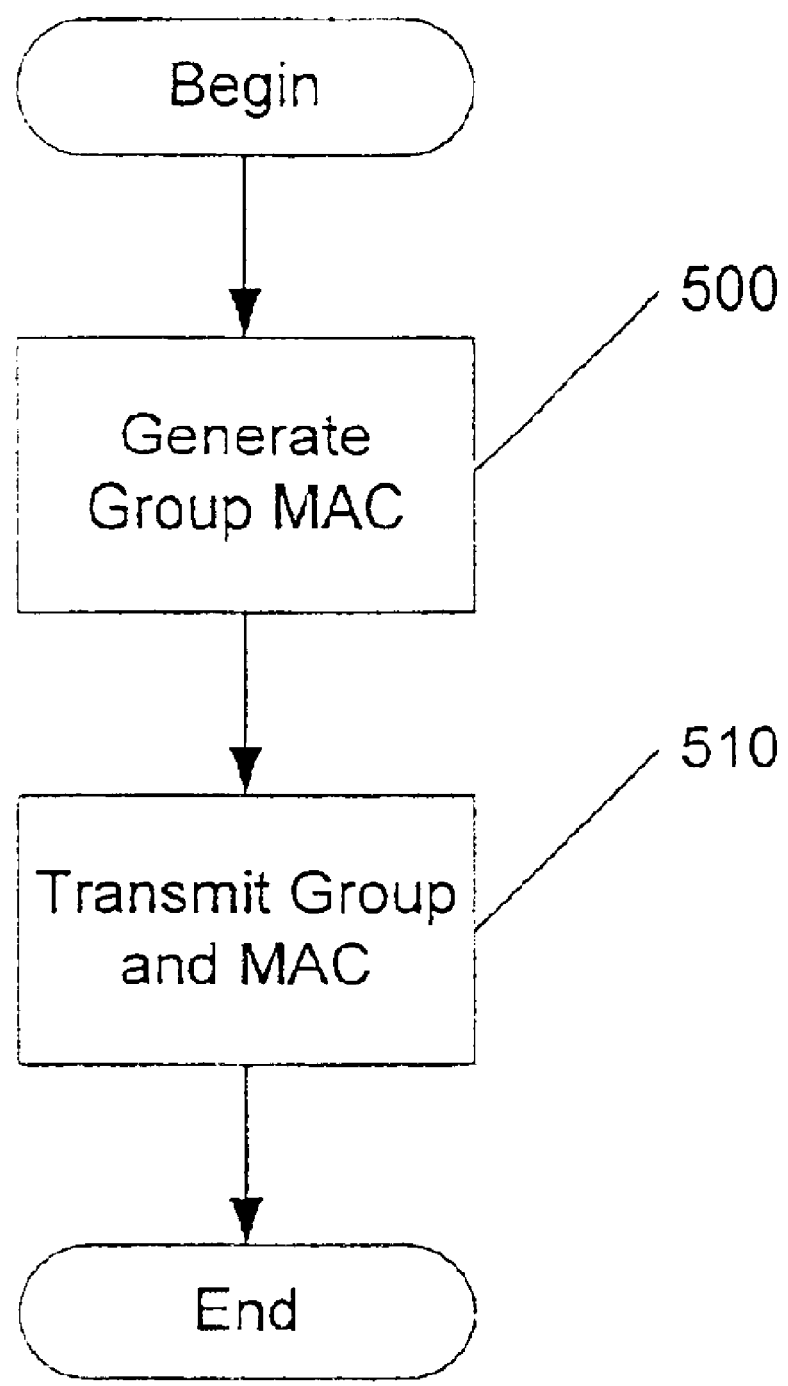
FIG. 5 is a flowchart illustrating operations according to embodiments of the present invention of message authentication for an SSL-based protocol connection between a source device and a destination device from the perspective of the source device.

Operations related to message authentication for an SSL protocol connection between a source device and destination device in accordance with various embodiments of the present invention will now be further described with reference to the flowchart diagram of FIG. 5. As shown in FIG. 5, a group message authentication code (MAC) based on a plurality of communication packets is generated at a source device (block 500). A packet may have a one to one correspondence to a data record or may include a plurality of data records. More particulary, a packet corresponds to a unit of data for which the conventional SSL protocol provides an associated MAC to facilitate streaming of data through network connections. The plurality of communication packets are transmitted using the SSL protocol connection along with the generated group MAC (block 510). However, in contrast to a conventional SSL protocol connection, ones of the plurality of communication packets do not individually include an associated packet MAC.

Figure 6:
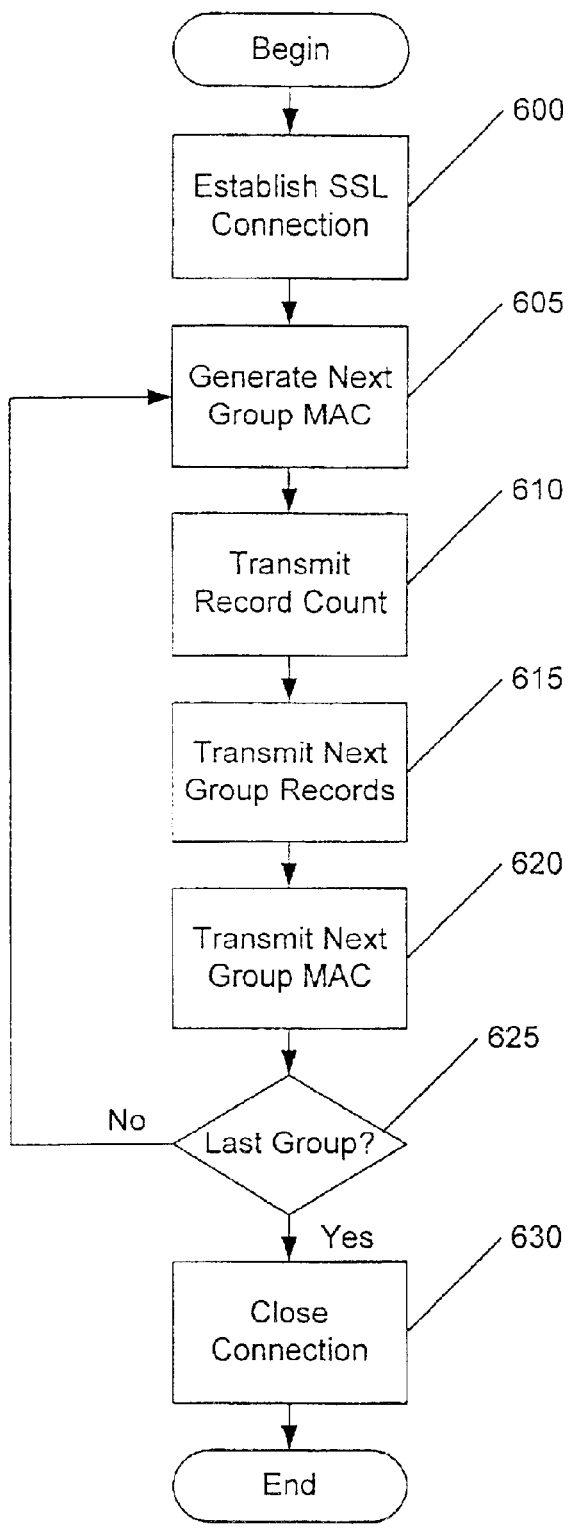
FIG. 6 is a flowchart illustrating operations according to further embodiments of the present invention of message authentication for an SSL-based protocol connection between a source device and a destination device from the perspective of the source device.

Operations from the perspective of a source device for message authentication for an SSL protocol connection between the source device and a destination device will now be described with reference to further embodiments illustrated in the flowchart diagram of FIG. 6. As shown in FIG. 6, the SSL protocol connection may be established with a designated destination device which will be referred to herein as a designated client (block 600). A group message authentication code (MAC) based on a plurality of communication packets is generated (block 605). Note that the group MAC is generally referred to herein as a next group MAC in light of the iterative nature of the operations as will be further described with reference to FIG. 6. The next group MAC is generated on each pass based on a corresponding next plurality of communication packets to be transmitted.

A record count is also transmitted using the SSL protocol connection (block 610). The record count indicates a number of data records to be received at the destination device before a next group MAC will be provided. The data records associated with the record count correspond to the next plurality of communication packets to be transmitted which are the same records used for generating the next group MAC at block 605. As described previously with reference to FIGS. 10A–10C, the record count is transmitted before the next plurality of communication packets and the next group MAC is preferably transmitted after the next plurality of communication packets.

A record count in accordance with various embodiments of the present invention is preferably transmitted before the corresponding group of communication packets represented by the record count. The group MAC may subsequently be transmitted following the data records used in generating the respective MAC. A next record count may then be transmitted, preferably without any intervening data records between the record count and the preceding MAC. However, in further embodiments of the present invention, the group MAC may be transmitted before its associated records in which case the record count indicates the number of data records subsequent to the group MAC to be used in generating a calculated MAC. However, in both cases, the record count indicates a number of data records to be received between successive group MACs.

Figure 7:
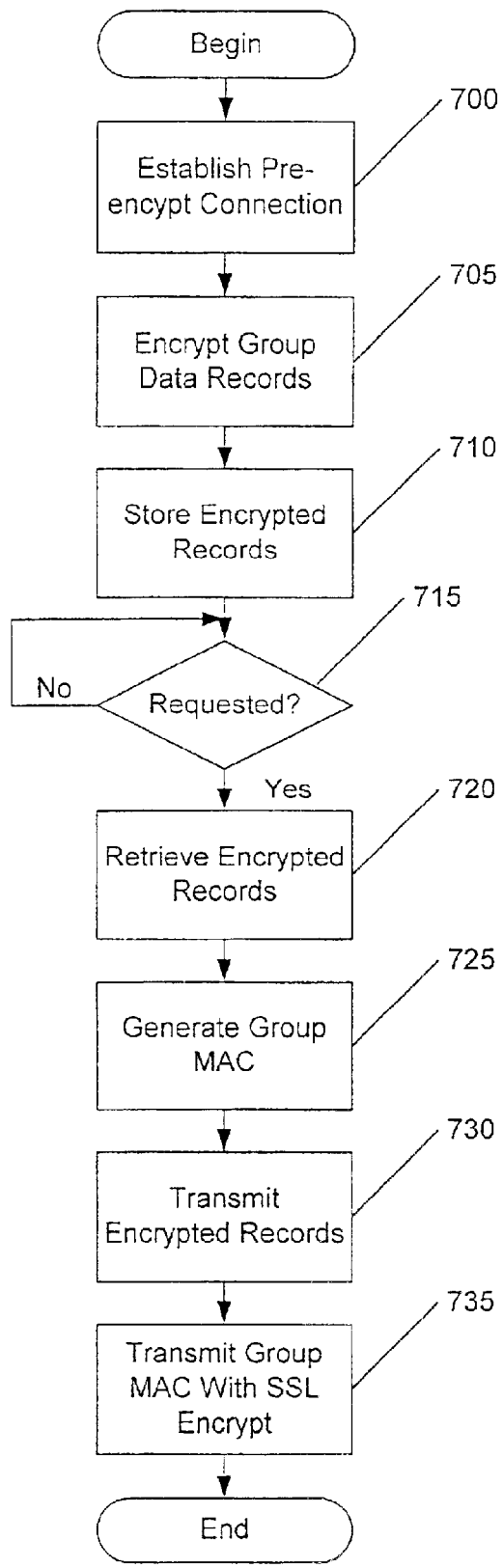
FIG. 7 is a flowchart illustrating operations according to embodiments of the present invention utilizing pre-encryption of data from the perspective of a source device.

If the group of packets for transmission is the last plurality of communication packets to be transmitted using the SSL protocol connection (block 625), the SSL protocol connection may be closed or terminated following transmission of the last plurality of communication packets. Otherwise, operations return to block 605 and repeat for additional pluralities of communication packets with associated group MACs as described with reference to blocks 605–625. Operations related to message authentication for an SSL protocol connection between a source device and a destination device utilizing pre-encryption according to various embodiments of the present invention will now be described from the perspective of a source device by reference to the flowchart diagram of FIG. 7. Operations begin with establishment of a pre-encryption based connection, such as illustrated by the "Hello" communications in FIG. 10A or 10C (block 700). Data records of a group of communication packets are encrypted to provide pre-encrypted data records (block 705). As illustrated in FIG. 7, the SSL connection is established before encryption of the data records. However, it is to be understood that the present invention is not so limited and pre-encryption operations may be provided in advance of establishment of the connection and used after establishment of the connection in supporting communications. In either case, the pre-encrypted data records are stored (block 710).

When a request for transmission of the pre-encrypted data records is received (block 715), the encrypted data records (or a subset thereof) are retrieved from storage (block 720). Note that, in various embodiments of the present invention, operations related to the initial encrypting of the data records (block 705) and storage of the encrypted data records (block 710) may be executed responsive to a first received request for transmission of the data records. A group MAC is generated based on the retrieved ones of the stored pre-encrypted data records (block 725).

The retrieved pre-encrypted data records are transmitted using the SSL protocol connection without using the SSL protocol connection to encrypt the pre-encrypted data records (block 730). The generated group MAC is transmitted using the SSL protocol connection to encrypt the group MAC prior to transmission (block 735).

In various embodiments of the present invention utilizing pre-encryption, the stored encrypted records are associated with a designated client with which the pre-encryption connection is established at block 700. A variety of approaches may be utilized for the pre-encryption in accordance with embodiments of the present invention. The pre-encryption operations at block 700 may be provided by encrypting the data records using a public key of the designated client. The public key of the designated client maybe determined based on a client certificate of the designated client negotiated in establishing the SSL protocol connection at block 700. Alternatively, a temporary key known by the designated client may be utilized for encrypting the data records at block 705. In yet further embodiments, a pre-encryption key may be transmitted to the designated client using the SSL protocol connection and the transmitted pre-encryption key may be used to encrypt the data records at block 705. The pre-encryption key may be transmitted to the designated client with the record count as illustrated, for example, in FIG. 10C. Furthermore, a copy of the pre-encryption key may be transmitted to the designated client with each transmitted record count.

Figure 8:
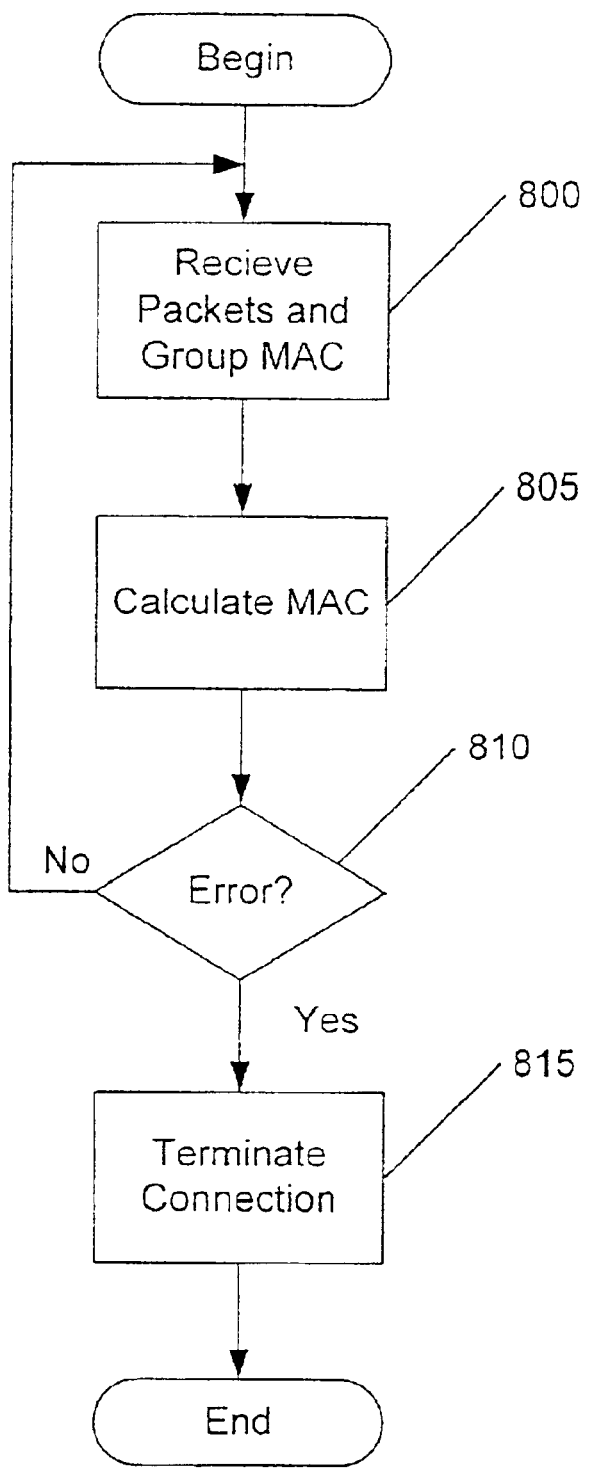
FIG. 8 is a flowchart illustrating operations according to embodiments of the present invention for message authentication for an SSL-based protocol connection between a source device and a destination device from the perspective of the destination device.

Operations related to message authentication for an SSL protocol connection between a source device and a destination device from the perspective of the destination device will now be described for various embodiments of the present invention with reference to the flowchart diagram of FIG. 8. As shown in FIG. 8, the destination device receives a plurality of communication packets and a group MAC that was generated based on the received plurality of communication packets (block 800). As described previously, from the source device perspective, individual ones of the received plurality of communication packets do not individually include associated packet MACs such as is conventionally provided by the SSL protocol.

A calculated MAC is generated based on the received plurality of communication packets (block 805). It is then determined if an error has occurred in the received plurality of communication packets based on a comparison of the calculated MAC from block 805 and the group MAC received at block 800 (block 810). As shown in FIG. 8, if an error is detected, the SSL protocol connection may be terminated (block 815).

Figure 9:
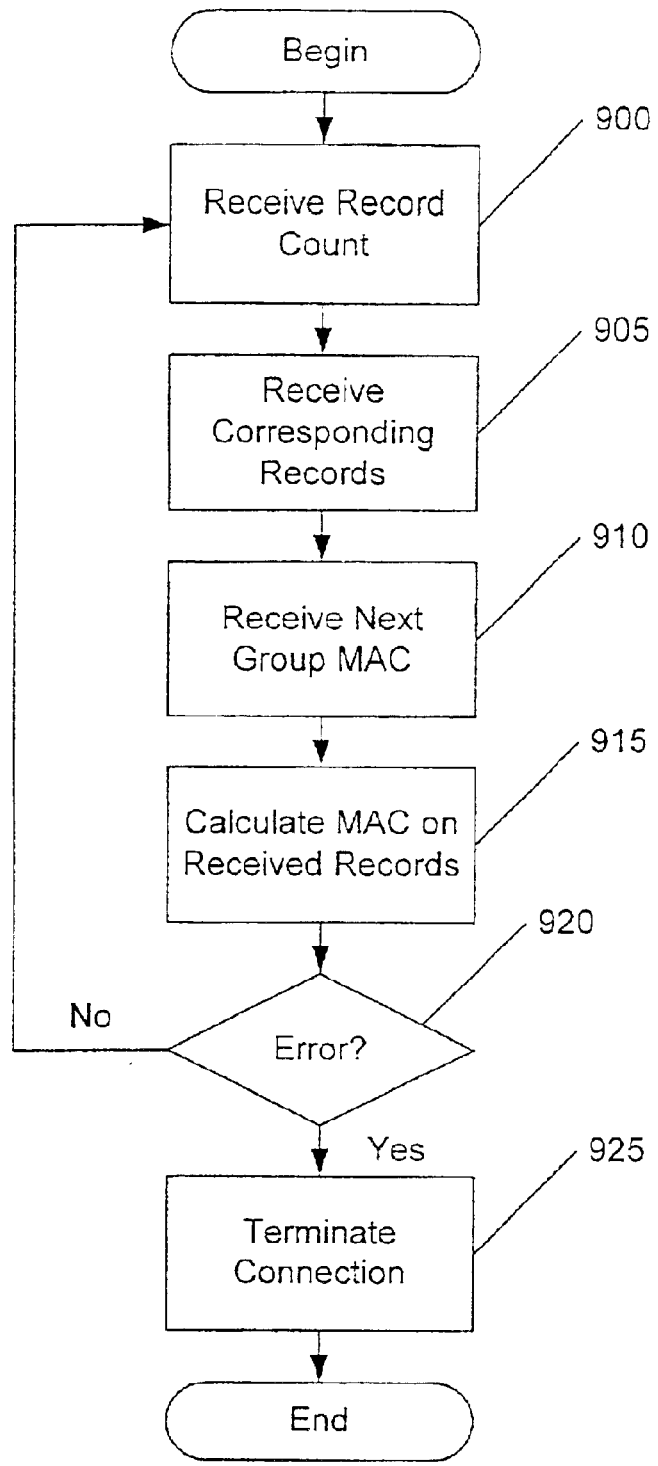
FIG. 9 is a flowchart illustrating operations according to further embodiments of the present invention for message authentication for an SSL-based protocol connection between a source device and a destination device from the perspective of the destination device.

Further embodiments of message authentication for an SSL protocol connection between a source device and a destination device from the perspective of the destination device will now be described with reference to the flowchart diagram of FIG. 9. As shown in FIG. 9, the destination device receives a record count over the SSL protocol connection (block 900). The record count, as described previously from the perspective of the source device, indicates a number of data records to be received at the destination device associated with a next group MAC to be received. Furthermore, the next group MAC to be received is itself generated based on a next group of communication packets to be received which correspond to the data records used to establish the received record count. In other words, if the received record count is specified as 20, the following 20 data records are the records used at the source device to generate the next group MAC which will be received at the destination device following (or, in some embodiments, prior to) receipt of the associated 20 data records corresponding to the received record count.

The destination device receives the number of data records of the next plurality of communication packets corresponding to the received record count from block 900 (block 905). The destination device also receives the next group MAC (block 910). The next group MAC received at block 910 corresponds to the group MAC generated by the source device based on the data records received at block 905. The destination device generates a calculated MAC based on the received data records from block 910 (block 915). It is determined if an error has occurred in the received data records from block 905 based on a comparison of the calculated MAC from block 915 and the received group MAC from block 910 (block 920). If an error is detected, the SSL protocol connection may be terminated (block 925). If no error is detected (block 920), operations return to block 900 and repeat as described above with reference to blocks 900–920 until a last plurality of communication packets is received. At such time as the last communication packets are received, the SSL protocol connection may be terminated without indication of an error.

The flowcharts and block diagrams of FIGS. 2 through 9 illustrate the architecture, functionality, and operation of possible implementations of systems, methods and computer program products for multi-packet message authentication according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A method of message authentication for an SSL-based protocol connection between a source device and a destination device, the method comprising:
   generating a group message authentication code (MAC) based on a plurality of communication packets, each of the communication packets having at least one data record; and
   transmitting the plurality of communication packets using the SSL-based protocol connection along with the generated group MAC, wherein ones of the plurality of communication packets do not include an associated packet MAC.

2. The method of claim 1 further comprising transmitting a record count using the SSL-based protocol connection, the record count indicating a number of data records to be received associated with a next group MAC to be received, the data records associated with the record count corresponding to a next plurality of communication packets to be transmitted and wherein the next group MAC is generated based on the next plurality of communication packets to be transmitted.

3. The method of claim 2 wherein the record count is transmitted using the SSL-based protocol connection before the next plurality of communication packets and wherein the next group MAC is transmitted after the next plurality of communication packets.

4. The method of claim 3 wherein the record count is transmitted using the SSL-based protocol connection either with the first plurality of communication packets or at a beginning of the next plurality of communication packets.

5. The method of claim 4 wherein the record count is transmitted following the generated group MAC without any intervening data records.

6. The method of claim 5 further comprising:

transmitting a last plurality of communication packets using the SSL-based protocol connection along with a last group MAC, the last group MAC being generated based on the last plurality of communication packets; and closing the SSL-based protocol connection following transmission of the last plurality of communication packets.

7. The method of claim 5 wherein at least a subset of communication packets from the plurality of communication packets has pre-encrypted data records and wherein the method further comprises:

encrypting data records of the at least a subset of communication packets to provide the pre-encrypted data records;

storing the pre-encrypted data records;

retrieving ones of the stored pre-encrypted data records for transmission responsive to a request for transmission of the ones of the stored pre-encrypted data records;

transmitting the retrieved ones of the stored pre-encrypted data records using the SSL-based protocol connection without using the SSL-based protocol connection to encrypt the retrieved ones of the stored pre-encrypted data records; and transmitting a group MAC generated based on the retrieved ones of the stored pre-encrypted data records using the SSL-based protocol connection to encrypt the group MAC generated based on the retrieved ones of the stored pre-encrypted data records.

8. The method of claim 7 further comprising establishing the SSL-based protocol connection with a designated client and wherein the pre-encrypted data records are associated with the designated client and wherein the encrypting step comprises encrypting data records of the at least a subset of communication packets using a public key of the designated client.

9. The method of claim 8 wherein establishing the SSL-based protocol connection further comprises negotiating a client certificate of the designated client and wherein the method further comprises determining the public key of the designated client based on the client certificate.

10. The method of claim 7 further comprising establishing the SSL-based protocol connection with a designated client and wherein the pre-encrypted data records are associated with the designated client and wherein the encrypting step comprises encrypting data records of the at least a subset of communication packets using a temporary key known by the designated client.

11. The method of claim 7 further comprising:

establishing the SSL-based protocol connection with a designated client;

transmitting a pre-encryption key to the designated client using the SSL-based protocol connection; and wherein the pre-encrypted data records are associated with the designated client and wherein the encrypting step comprises encrypting data records of the at least a subset of communication packets using the pre-encryption key.

12. The method of claim 11 wherein transmitting a pre-encryption key comprises transmitting the pre-encryption key to the designated client with the record count.

13. The method of claim 11 further comprising transmitting a plurality of groups of communication packets having pre-encrypted data records, each of the groups of communication packets having an associated group MAC and an associated record count, using the SSL-based protocol connection, wherein the associated group MACs and associated record counts are transmitted using the SSL-based protocol connection to encrypt the associated group MACs and associated record counts and the pre-encrypted data records are transmitted without using the SSL-based protocol connection to encrypt the pre-encrypted data records, and wherein transmitting a pre-encryption key to the designated client comprises transmitting a pre-encryption key with each of the associated record counts.

14. The method of claim 5 further comprising the following executed by the destination device.

receiving the first plurality of communication packets and the generated group MAC;

generating a calculated MAC based on the received first plurality of communication packets; and determining if an error has occurred in the received first plurality of communication packets based on a comparison of the calculated MAC and the received generated group MAC.

15. The method of claim 14 further comprising terminating the SSL-based protocol connection if it is determined that an error has occurred.

16. The method of claim 14 further comprising the following executed by the destination device:

receiving the record count;

receiving a number of data records of the next plurality of communication packets corresponding to the received record count;

receiving the next group MAC;

generating a next calculated MAC based on the received data records of the next plurality of communication packets; and determining if an error has occurred in the received data records of the next plurality of communication packets based on a comparison of the next calculated MAC and the received next group MAC.

17. The method of claim 1 wherein at least a subset of communication packets from the plurality of communication packets have pre-encrypted data records and wherein the method further comprises:

encrypting data records of the at least a subset of communication packets to provide the pre-encrypted data records;

storing the pre-encrypted data records;

retrieving ones of the stored pre-encrypted data records for transmission responsive to a request for transmission of the ones of the stored pre-encrypted data records;

transmitting the retrieved ones of the stored pre-encrypted data records using the SSL-based protocol connection without using the SSL-based protocol connection to encrypt the retrieved ones of the stored pre-encrypted data records; and transmitting a group MAC generated based on the retrieved ones of the stored pre-encrypted data records using the SSL-based protocol connection to encrypt the group MAC generated based on the retrieved ones of the stored pre-encrypted data records.

18. The method of claim 17 further comprising establishing the SSL-based protocol connection with a designated client and wherein the pre-encrypted data records are associated with the designated client and wherein the encrypting step comprises encrypting data records of the at least a subset of communication packets using a public key of the designated client.

19. The method of claim 17 further comprising establishing the SSL-based protocol connection with a designated client and wherein the pre-encrypted data records are associated with the designated client and wherein the encrypting step comprises encrypting data records of the at least a subset of communication packets using a temporary key known by the designated client.

20. The method of claim 1 further comprising the following executed by the destination device:
receiving the first plurality of communication packets and the generated group MAC;
generating a calculated MAC based on the received first plurality of communication packets; and
determining if an error has occurred in the received first plurality of communication packets based on a comparison of the calculated MAC and the received generated group MAC.

21. The method of claim 20 further comprising terminating the SSL-based protocol connection if it is determined that an error has occurred.

22. A method for message authentication for an SSL-based protocol connection between a source device and a destination device, the method comprising:
receiving a first plurality of communication packets and a group MAC that was generated based on the first plurality of communication packets, wherein ones of the first plurality of communication packets do not include an associated packet MAC;
generating a calculated MAC based on the received first plurality of communication packets; and
determining if an error has occurred in the received first plurality of communication packets based on a comparison of the calculated MAC and the received group MAC.

23. The method of claim 22 further comprising:
receiving a record count, the record count indicating a number of data records to be received before a next group MAC, the next group MAC being generated based on a next plurality of communication packets corresponding the data records associated with the record count;
receiving a number of data records of the next plurality of communication packets corresponding to the received record count;
receiving the next group MAC;
generating a next calculated MAC based on the received data records of the next plurality of communication packets; and
determining if an error has occurred in the received data records of the next plurality of communication packets based on a comparison of the next calculated MAC and the received next group MAC.

24. The method of claim 23 wherein the record count is received using the SSL-based protocol connection before the data records of the next plurality of communication packets corresponding to the received record count.

25. The method of claim 24 wherein the record count is received after the first group MAC without any intervening data records.

26. A system of message authentication for an SSL-based protocol connection between a source device and a destination device, the system comprising:
a group message authentication code (MAC) generation circuit that generates a group MAC based on a plurality of communication packets, each of the communication packets having at least one data record; and
a transmitter that transmits the plurality of communication packets using the SSL-based protocol connection along with the generated group MAC, wherein ones of the plurality of communication packets do not include an associated packet MAC.

27. The system of claim 26 further comprising:
a record count generation circuit that generates a record count indicating a number of data records to be received associated with a next group MAC to be received, the data records associated with the record count corresponding to a next plurality of communication packets to be transmitted;
wherein the transmitter is further configured to transmit the record count using the SSL-based protocol connection; and
wherein the group MAC generation circuit is further configured to generate the next group MAC based on the next plurality of communication packets to be transmitted.

28. The system of claim 27 further comprising an SSL-based connection control circuit that closes the SSL-based protocol connection following transmission of a last plurality of communication packets.

29. The system of claim 27 further comprising:
a pre-encryption circuit that encrypts data records of at least a subset of communication packets of the plurality of communication packets based on either a temporary key or a client key associated with a designated client associated with the SSL-based protocol connection to provide pre-encrypted data records; and
wherein the transmitter is further configured to transmit the pre-encrypted data records without using the SSL-based protocol connection to encrypt the pre-encrypted records and to transmit a group MAC generated based on the pre-encrypted data records using the SSL-based protocol connection to encrypt the group MAC generated based on the pre-encrypted data records.

30. The system of claim 29 wherein the SSL-based connection control circuit is further configured to establish the SSL-based protocol connection with the destination device as a pre-encrypted data records based connection.

31. A system of message authentication for an SSL-based protocol connection between a source device and a destination device, the system comprising:
a receiver that receives a first plurality of communication packets and a group MAC that was generated based on the first plurality of communication packets, wherein ones of the first plurality of communication packets do not include an associated packet MAC;
a message authentication code (MAC) generation circuit that generates a calculated MAC based on the received first plurality of communication packets; and
an error detection circuit that determines if an error has occurred in the received first plurality of communication packets based on a comparison of the calculated MAC and the received group MAC.

32. The system of claim 31 wherein:

the receiver is further configured to receive a record count, the record count indicating a number of data records to be received before a next group MAC, the next group MAC being generated based on a next plurality of communication packets corresponding the data records associated with the record count and to receive a number of data records of the next plurality of communication packets corresponding to the received record count and to receive the next group MAC;

the MAC generation circuit is further configured to generate a next calculated MAC based on the received data records of the next plurality of communication packets; and the error detection circuit if further configured to determine if an error has occurred in the received data records of the next plurality of communication packets based on a comparison of the next calculated MAC and the received next group MAC.

33. A system of message authentication for an SSL-based protocol connection between a source device and a destination device, the system comprising:

means for generating a group message authentication code (MAC) based on a plurality of communication packets, each of the communication packets having at least one data record; and means for transmitting the plurality of communication packets using the SSL-based protocol connection along with the generated group MAC, wherein ones of the plurality of communication packets do not include an associated packet MAC.

34. The system of claim 33 further comprising means for transmitting a record count using the SSL-based protocol connection, the record count indicating a number of data records to be received associated with a next group MAC to be received, the data records associated with the record count corresponding to a next plurality of communication packets to be transmitted and wherein the next group MAC is generated based on the next plurality of communication packets to be transmitted.

35. The system of claim 34 wherein the record count is transmitted using the SSL-based protocol connection before the next plurality of communication packets and wherein the next group MAC is transmitted after the next plurality of communication packets.

36. The system of claim 33 wherein at least a subset of communication packets from the plurality of communication packets have pre-encrypted data records and wherein the system further comprises:

means for encrypting data records of the at least a subset of communication packets to provide the pre-encrypted data records;

means for storing the pre-encrypted data records;

means for retrieving ones of the stored pre-encrypted data records for transmission responsive to a request for transmission of the ones of the stored pre-encrypted data records;

means for transmitting the retrieved ones of the stored pre-encrypted data records using the SSL-based protocol connection without using the SSL-based protocol connection to encrypt the retrieved ones of the stored pre-encrypted data records; and means for transmitting a group MAC generated based on the retrieved ones of the stored pre-encrypted data records using the SSL-based protocol connection to encrypt the group MAC generated based on the retrieved ones of the stored pre-encrypted data records.

37. The system of claim 33 further comprising the destination device wherein the destination device comprises:

means for receiving the first plurality of communication packets and the generated group MAC;

means for generating a calculated MAC based on the received first plurality of communication packets; and means for determining if an error has occurred in the received first plurality of communication packets based on a comparison of the calculated MAC and the received generated group MAC.

38. A system for message authentication for an SSL-based protocol connection between a source device and a destination device, the system comprising:

means for receiving a first plurality of communication packets and a group MAC that was generated based on the first plurality of communication packets, wherein ones of the first plurality of communication packets do not include an associated packet MAC;

means for generating a calculated MAC based on the received first plurality of communication packets; and means for determining if an error has occurred in the received first plurality of communication packets based on a comparison of the calculated MAC and the received group MAC.

39. The system of claim 38 further comprising:

means for receiving a record count, the record count indicating a number of data records to be received before a next group MAC, the next group MAC being generated based on a next plurality of communication packets corresponding the data records associated with the record count;

means for receiving a number of data records of the next plurality of communication packets corresponding to the received record count;

means for receiving the next group MAC;

means for generating a next calculated MAC based on the received data records of the next plurality of communication packets; and means for determining if an error has occurred in the received data records of the next plurality of communication packets based on a comparison of the next calculated MAC and the received next group MAC.

40. A computer program product of message authentication for an SSL-based protocol connection between a source device and a destination device, comprising:

a computer readable storage medium having computer readable program code embodied in said medium, said computer readable program code comprising:

computer readable code which generates a group message authentication code (MAC) based on a plurality of communication packets, each of the communication packets having at least one data record; and computer readable code which transmits the plurality of communication packets using the SSL-based protocol connection along with the generated group MAC, wherein ones of the plurality of communication packets do not include an associated packet MAC.

41. The computer program product of claim 40 further comprising computer readable code which transmits a record count using the SSL-based protocol connection, the record count indicating a number of data records to be received associated with a next group MAC to be received, the data records associated with the record count corresponding to a next plurality of communication packets to be transmitted and wherein the next group MAC is generated based on the next plurality of communication packets to be transmitted.

42. The computer program product of claim 41 wherein the record count is transmitted using the SSL-based protocol connection before the next plurality of communication packets and wherein the next group MAC is transmitted after the next plurality of communication packets.

43. The computer program product of claim 40 wherein at least a subset of communication packets from the plurality of communication packets have pre-encrypted data records and wherein the computer program product further comprises:

computer readable code which encrypts data records of the at least a subset of communication packets to provide the pre-encrypted data records;

computer readable code which stores the pre-encrypted data records;

computer readable code which retrieves ones of the stored pre-encrypted data records for transmission responsive to a request for transmission of the ones of the stored pre-encrypted data records;

computer readable code which transmits the retrieved ones of the stored pre-encrypted data records using the SSL-based protocol connection without using the SSL-based protocol connection to encrypt the retrieved ones of the stored pre-encrypted data records; and computer readable code which transmits a group MAC generated based on the retrieved ones of the stored pre-encrypted data records using the SSL-based protocol connection to encrypt the group MAC generated based on the retrieved ones of the stored pre-encrypted data records.

44. The computer program product of claim 40 further comprising the following configured for execution on the destination device:

computer readable code which receives the first plurality of communication packets and the generated group MAC;

computer readable code which generates a calculated MAC based on the received first plurality of communication packets; and computer readable code which determines if an error has occurred in the received first plurality of communication packets based on a comparison of the calculated MAC and the received generated group MAC.

45. A computer program product of message authentication for an SSL-based protocol connection between a source device and a destination device, comprising:

a computer readable storage medium having computer readable program code embodied in said medium, said computer readable program code comprising:

computer readable code which receives a first plurality of communication packets and a group MAC that was generated based on the first plurality of communication packets, wherein ones of the first plurality of communication packets do not include an associated packet MAC;

computer readable code which generates a calculated MAC based on the received first plurality of communication packets; and computer readable code which determines if an error has occurred in the received first plurality of communication packets based on a comparison of the calculated MAC and the received group MAC.

46. The computer program product of claim 45 further comprising:

computer readable code which receives a record count, the record count indicating a number of data records to be received before a next group MAC, the next group MAC being generated based on a next plurality of communication packets corresponding the data records associated with the record count;

computer readable code which receives a number of data records of the next plurality of communication packets corresponding to the received record count;

computer readable code which receives the next group MAC;

computer readable code which generates a next calculated MAC based on the received data records of the next plurality of communication packets; and computer readable code which determines if an error has occurred in the received data records of the next plurality of communication packets based on a comparison of the next calculated MAC and the received next group MAC.

* * * * *